United States Patent
Gugwad et al.

(10) Patent No.: US 11,483,185 B1
(45) Date of Patent: Oct. 25, 2022

(54) HARDWARE EFFICIENT DECISION FEEDBACK EQUALIZATION TRAINING

(71) Applicant: Cadence Design Systems, Inc., San Jose, CA (US)

(72) Inventors: Sachin Ramesh Gugwad, Bangalore (IN); Hari Anand Ravi, Bangalore (IN); Aaron Willey, Hayward, CA (US); Thomas E. Wilson, Laurel, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/246,581

(22) Filed: Apr. 30, 2021

(51) Int. Cl.
*H04L 25/03* (2006.01)
(52) U.S. Cl.
CPC ............ *H04L 25/03057* (2013.01); *H04L 2025/03484* (2013.01); *H04L 2025/03617* (2013.01)
(58) Field of Classification Search
CPC ..... H04L 25/03057; H04L 2025/03484; H04L 2025/03617
See application file for complete search history.

(56) References Cited

U.S. PATENT DOCUMENTS

| | | | |
|---|---|---|---|
| 6,085,346 A * | 7/2000 | Lepejian | G11C 29/36 714/724 |
| 9,680,436 B1 * | 6/2017 | Malhotra | H03G 3/3036 |
| 10,545,895 B1 | 1/2020 | Willey et al. | |
| 11,277,285 B1 * | 3/2022 | Gugwad | H04L 25/03133 |
| 11,323,296 B1 * | 5/2022 | Gugwad | H04L 27/01 |
| 2012/0151247 A1 * | 6/2012 | Ferraiolo | H04L 25/14 714/E11.079 |
| 2019/0095308 A1 * | 3/2019 | Morris | G11C 29/028 |
| 2022/0116248 A1 * | 4/2022 | Jalali | H04L 25/03146 |

OTHER PUBLICATIONS

Choi, W., et al., "A 5-GB/s digitally controlled 3-tap DFE receiver for serial communications," ResearchGate, dated Nov. 2010.
Razavi, B., "The Decision-Feedback Equalizer," IEEE Solid-State Circuits Magazine, dated Fall 2017.
Thakkar, C., "Decision Feedback Equalizer Design for60GHz Mobile Transceivers," Electrical Engineering and Computer Sciences University of California at Berkeley Technical Report No. UCB/EECS-2012-190, Aug. 20, 2012.

(Continued)

*Primary Examiner* — Sophia Vlahos
(74) *Attorney, Agent, or Firm* — Vista IP Law Group, LLP

(57) ABSTRACT

Disclosed is an improved approach for a training approach to implement DFE for an electronic circuit. The inventive concept is particularity suitable to address, for example, circuits that implement high speed parallel data transmission protocols, such as GDDR6, that are used for graphics applications. The training scheme uses minimal hardware when compared to existing schemes by reusing calibration receiver in auto zeroing receiver as error receiver. Further it works for closed eyes by running the algorithm multiple times with gradual increase in complexity of training pattern, where DFE coefficients from previous iteration is used for the current iteration, thereby gradually opening the eye.

20 Claims, 24 Drawing Sheets

(56) References Cited

OTHER PUBLICATIONS

Chang, C., "An Area Efficient 4Gb/s 3-Tap Decision Feedback Equalizer with Current-Integrating Summer," The Department of Electrical and Computer Engineering, Apr. 2016.
"Technical Note GDDR6: The Next-Generation Graphics DRAM," Micron Technology, Inc. Copyright 2017.
Kim, C., "High-Bandwidth Memory Interface Design," Dept. of Electrical Engineering Korea University, Seoul, Korea, dated Feb. 17, 2013.
Kim, Y., et al., "A 16Gb 18Gb/s/pin GDDR6 DRAM with Per-Bit Trainable Single-Ended DFE and PLL-Less Clocking," Samsung Electronics, IEEE, copyright 2018.

\* cited by examiner

| # | Terms | Description |
|---|---|---|
| 1 | RX_L | Receiver with lower VREFL (Lower voltage reference) will be choosen when previous bit is 'low' |
| 2 | RX_H | Receiver with lower VREFH (Higher voltage reference) will be choosen when previous bit is 'high' |
| 3 | RX_CAL | Calibration Receiver used for auto-zeroing. This acts as error receiver during DFE training. |
| 4 | VREFL_SEL | Reference voltage generator's control codes which sets VREFL voltage level (Lower voltage reference) |
| 5 | VREFH_SEL | Reference voltage generator's control codes which sets VREFH voltage level (Higher voltage reference) |
| 6 | VREFE_SEL | Reference voltage generator's control codes which sets VREFE voltage level (Voltage reference of error rx) |
| 7 | VREFL/VREFH | DFE trained voltage reference for receiver |
| 8 | VREFE | Reference voltage for error receiver |
| 9 | RX_DFE_TAP2[5:0] | Receiver DFE Tap2 Coefficient |
| 10 | RX_EQ_TRAIN_MODE[1:0] | 11 → Multi Tap DFE training mode is selected |
| 11 | RX_EQ_TRAIN_EN[2:0] | 000 → Training mode is disabled (Normal read mode is enabled)<br>!000 → Training mode is enabled and each values specify training step (explained in next slides) |
| 12 | RX_DFE_EN[1:0] | During Multi Tap DFE Training ( when RX_EQ_TRAIN_MODE[1:0] = 11 and RX_EQ_TRAIN_EN[2:0] != "000")<br>00/01/10 : Only 1st TAP DFE training is enabled<br>11 : Both 1st Tap and 2nd DFE training is enabled |
| 13 | I_DOUT | Received data sampled by ICLK |
| 14 | I_DOUT_DLY | Previous bit of I_DOUT |
| 15 | Q_DOUT | Received data sampled by QCLK (Its used as error data during DFE training sampled by ICLK) |
| 16 | Q_DOUT_DLY | Previous bit of Q_DOUT |
| 17 | QCLK | Clock used to sample edge of data eye |
| 18 | ICLK | Clock used to sample center of data eye |
| 19 | I samples | Reference receiver output used in DFE training. These samples are used as reference data |
| 20 | E samples | Error receiver output used in DFE training. These are actual error samples used in LMS based DFE training. |

Fig. 5B

| Sl.No | Register Name | Description |
|---|---|---|
| 1 | "VREF_INIT" | Trained VREF value ( from CDR/VREF training ) |
| 2 | "VREFE_L" | Logic low threshold for error receiver |
| 3 | "VREFE_H" | Logic high threshold for error receiver |
| 4 | "VREFL_A" | VREFL value from "00" pattern |
| 5 | "VREFL_B" | VREFL value from "01" pattern |
| 6 | "TAP2_L_A" | Tap2 value from "00" pattern |
| 7 | "TAP2_L_B" | Tap2 value from "01" pattern |
| 8 | "VREFH_A" | VREFH value from "11" pattern |
| 9 | "VREFH_B" | VREFH value from "10" pattern |
| 10 | "TAP2_H_A" | Tap2 value from "11" pattern |
| 11 | "TAP2_H_B" | Tap2 value from "10" pattern |
| 12 | "VREFL_FINAL" | Final VREFL trained value updated every loop |
| 13 | "VREFH_FINAL" | Final VREFH trained value updated every loop |
| 14 | "TAP2_FINAL" | Final Tap2 trained value updated every loop |

Fig. 5C

| Set RX_EQ_TRAIN_MODE |
|---|
| Load register "VREF_INIT", "VREFL_FINAL" and VREFH_FINAL" |
| Load register "TAP2_FINAL" with default value |
| Load RX_DFE_TAP2[5:0] with default value during training |

Fig. 6A

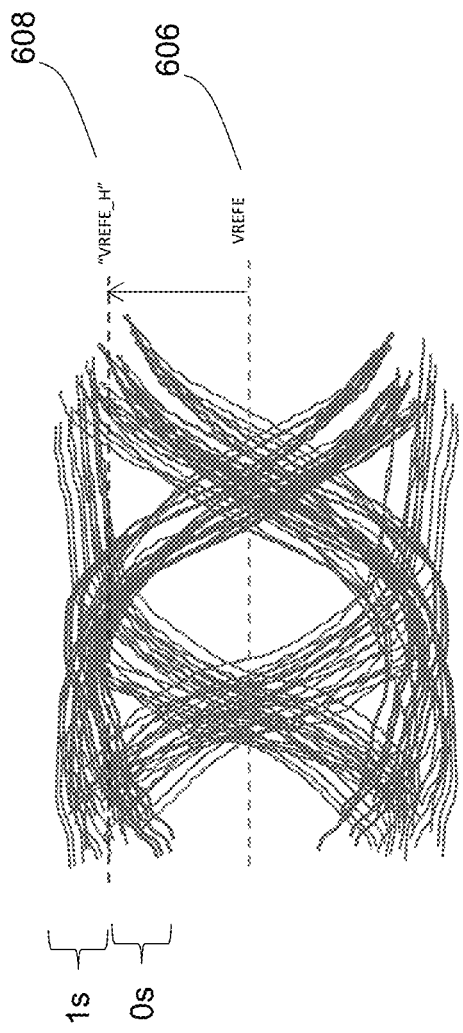

| STEP D | |
|---|---|
| Load following: | VREFE = register "VREFE_H" |
| Check I_DOUT = 1 and I_DOUT_DLY=0 ? | • No : Do nothing<br>• Yes : Proceed |
| Check Q_DOUT = 0s > 1s ? | • No : Increase VREFE<br>• Yes : Decrease VREFE |
| Store if VREFE is wobbling within threshold set, Then store ["VREFE_L"/2-"VREFE_H"/2+VREFE] in register "VREFL_B" | |

| STEP E | |
|---|---|
| VREFE = register "VREFE_H" | |
| Check I_DOUT = 1 and I_DOUT_DLY=1 ?<br>• No : Do nothing<br>• Yes : Proceed | |
| Check Q_DOUT = 0s > 1s ?<br>• No : Increase VREFE<br>• Yes : Decrease VREFE | |
| Store if VREFE is wobbling within threshold set , Then store ["VREFE_L"/2-"VREFE_H"/2+VREFE] in register "VREFH_A" | |

| STEP F | |
|---|---|
| VREFE = register "VREFE_L" | |
| Check I_DOUT = 0 and I_DOUT_DLY=1 ?<br>• No : Do nothing<br>• Yes : Proceed | |
| Check Q_DOUT = 0s > 1s ?<br>• No : Increase VREFE<br>• Yes : Decrease VREFE | |
| Store if VREFE is wobbling within threshold set, Then store ["VREFE_H"/2-VREFE_L/2"+VREFE] in register "VREFH_B" | |
| Store Average value of "VREFL_A" and "VREFL_B" in register "VREFL_FINAL" | |
| Store Average value of "VREFH_A" and "VREFH_B" in register "VREFH_FINAL" | |

Fig. 6G-1

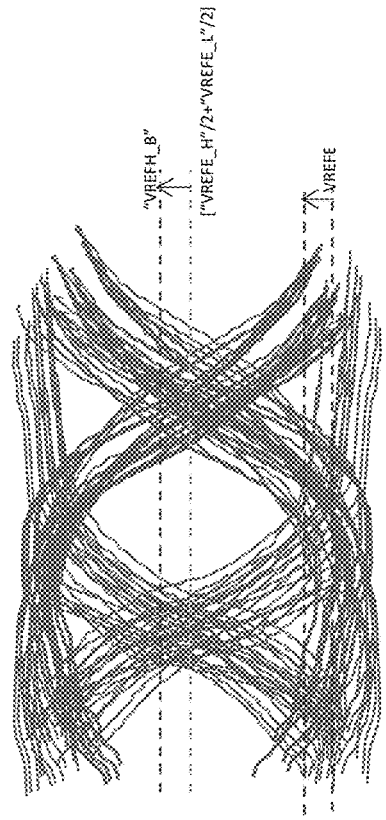

Fig. 6G-2

| |
|---|
| Need to run this only if RX_DFE_EN<1:0> = 11 |
| Load register "VREFL_FINAL" in VREFL<br>Load register "VREFH_FINAL" in VREFH<br>STEP 1 : VREFE = register "VREFL_FINAL+(VREFE_L-VREFE_H)/2"<br>RX_DFE_TAP2[5:0] = register "TAP2_FINAL" |
| Set : RX_EQ_TRAIN_EN[2:0]= 011 ( To define I samples and Q samples during calibration mode)<br>Check I_DOUT = 0 and I_DOUT_DLY=0 ?<br>• No : Do nothing<br>• Yes : Proceed |
| Check (Q_DOUT ^ I_DOUT_DLY_2)= 0s > 1s ?<br>• No : Decrease TAP2<br>• Yes : Increase TAP2 |
| Store if TAP2 is wobbling within threshold set, in register "TAP2_L_A" |

Fig. 7A-1

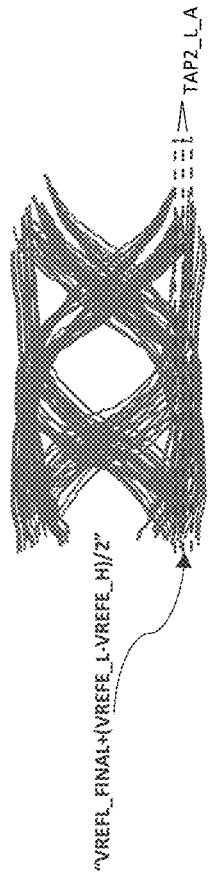

Fig 7a. DFE tap2 Training Step 1

Fig. 7A-2

| STEP 2 : Load VREFE = register "VREFL_FINAL+(VREFE_H-VREFE_L)/2" RX_DFE_TAP2[5:0] = register "TAP2_FINAL" |
|---|
| Set : RX_EQ_TRAIN_EN[2:0] = 100 (To define I samples and Q samples during calibration mode) Check I_DOUT = 1 and I_DOUT_DLY=0 ? <br> • No : Do nothing <br> • Yes : Proceed |
| Check (Q_DOUT ^ I_DOUT_DLY_2)= 0s > 1s ? <br> • No : Decrease TAP2 <br> • Yes : Increase TAP2 |
| Store if TAP2 is wobbling within threshold set, in register "TAP2_L_B" |

Fig. 7B-1

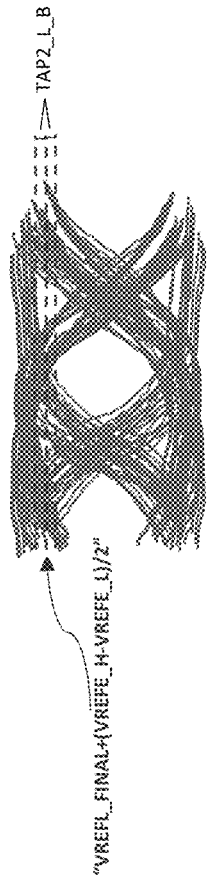

Fig 7b. DFE tap2 Training Step 2

Fig. 7B-2

| |
|---|
| STEP 3 : Load VREFE = register "VREFH_FINAL+(VREFE_H-REFE_L)/2" RX_DFE_TAP2[5:0] = register "TAP2_FINAL." |
| Set : RX_EQ_TRAIN_EN[2:0]= 101 (To define I samples and Q samples during calibration mode)<br>Check I_DOUT = 1 and I_DOUT_DLY=1 ?<br>• No : Do nothing<br>• Yes : Proceed |
| Check (Q_DOUT ^ I_DOUT_DLY_2)= 0s > 1s ?<br>• No : Decrease TAP2<br>• Yes : Increase TAP2 |
| Store if TAP2 is wobbling within threshold set, in register "TAP2_H_A" |

Fig. 7C-1

*Fig 7c. DFE tap2 Training Step 3*

Fig. 7C-2

| STEP 4 : VREFE = register "VREFH_FINAL+(VREFE_L-VREFE_H)/2" RX_DFE_TAP2[5:0] = register "TAP2_FINAL" |
|---|
| Set : RX_EQ_TRAIN_EN[2:0]= 110 ( To define I samples and Q samples during calibration mode) Check I_DOUT = 0 and I_DOUT_DLY=1 ? • No : Do nothing • Yes : Proceed |
| Check (Q_DOUT ^ I_DOUT_DLY_2)= 0s > 1s ? • No : Decrease TAP2 • Yes : Increase TAP2 |
| Store if TAP2 is wobbling within threshold set, in register "TAP2_H_B" |

Fig. 7D-1

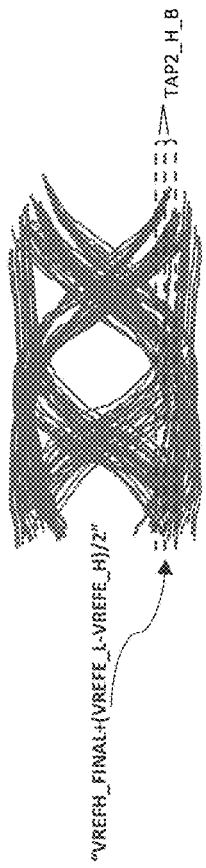

Fig 7d. DFE tap2 Training Step 4

Fig. 7D-2

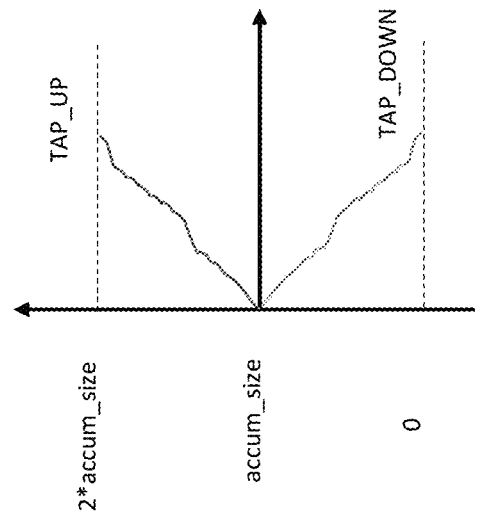
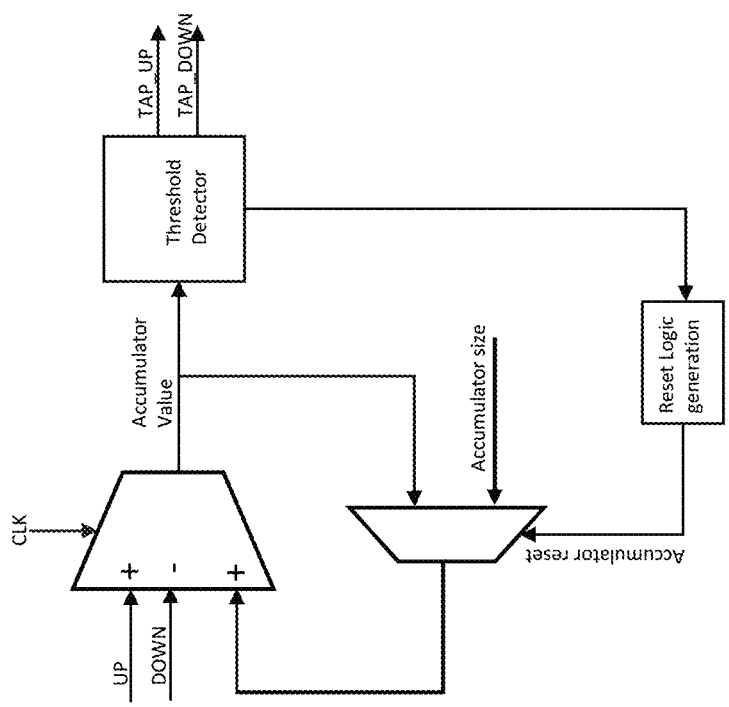
Fig. 8B
Fig. 8A

HARDWARE EFFICIENT DECISION FEEDBACK EQUALIZATION TRAINING

BACKGROUND

A typical computing device is implemented with a microprocessor, memory, and a number of other modules depending on the function to be performed by the computing device. DDR (double data rate) random access memory (RAM) is a particular type of RAM commonly used in current technology that performs two read accesses or two write accesses per clock cycle. Microprocessors and DDR RAM both operate on various different power supply voltages. Interface circuits that can convert between different signal levels and different drive levels are used to allow for compatible communications between microprocessors and memory devices.

As the DRAM (dynamic RAM) sector approaches very fast speeds and throughput in current and proposed DDR standard protocols, their performance can suffer, especially while power and area restrictions continue to be imposed on interface circuits. This may be caused, for example, by distortions that are introduced into the system. A solution to these and other problems is thus desirable.

For example, consider graphics-related memory such as GDDR (graphics DDR) memory which is a modern protocol for memory products that implement very high data speeds. Signal integrity becomes a very real problem for memories that implement high speed protocols (such as GDDR6), due to issues such as channel losses, impedance matching, dispersion, and jitters. This is problematic for interfaces that need to reliably detect the signal levels that correspond to logic "1" and "0" bits, especially as previous bits start to affect the correct detection of the current bits.

Attempts have been made to try and implement training schemes to configure parameters to address these problems, where the trained parameters are employed within the interface circuitry that communicate with the memory devices. DFE (decision feedback equalizer) is an approach that may be taken where values pertaining to past decisions can be used to consider a current signal interval. In one possible DFE implementation, LMS (least mean square) is employed in conjunction with DFE such that a pre-selected initial error threshold is identified to implement the training. However, there are numerous drawbacks with this approach. One drawback is that the requirement to pre-select the initial error threshold means that, if the initial threshold is not correctly set, this may result in sub-optimal final results. Another problem is that this approach may require excessive numbers of receivers, which therefore may not allow this approach to be used for existing designs that lack the required number of receivers.

Therefore, there is a need for an improved approach to implement equalizations for electronic circuits to address these problems.

SUMMARY

Some embodiments provide an improved approach to implement a training approach to find optimal DFE coefficients for an electronic circuit. The inventive concept is particularly suitable to address, for example, circuits that implement high speed parallel data transmission protocols, such as GDDR6, that are used for graphics applications.

Other and additional objects, features, and advantages of the invention are described in the detailed description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5B describes a description of the signals identified within FIG. 5A.

FIG. 5C provides a description of the registers used within the architecture of FIG. 5A.

FIGS. 6A, 6B-1, 6B-2, 6C-1, 6C-2, 6D-1, 6D-2, 6E-1, 6E-2, 6F-1, 6F-2, and 6G-1, 6G-2 provide a detailed illustrative example of the individual steps to implement the Tap 1 unrolled DFE training phase.

FIGS. 7A-1, 7A-2, 7B-1, 7B-2, 7C-1, 7C-2, 7D-1, 7D-2, and 7E provide a detailed illustrative example of the individual steps to perform the Tap 2 DFE training.

FIGS. 8A-B provide an illustration of an approach to make sure that sufficient data exists to make an increase or decrease to a value during training.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments described herein relate to circuits and techniques for implementing an improved training scheme to interface with memory devices, particularly memory devices such as DDR SDRAM in accordance with protocols such as GDDR6.

Figure 1:
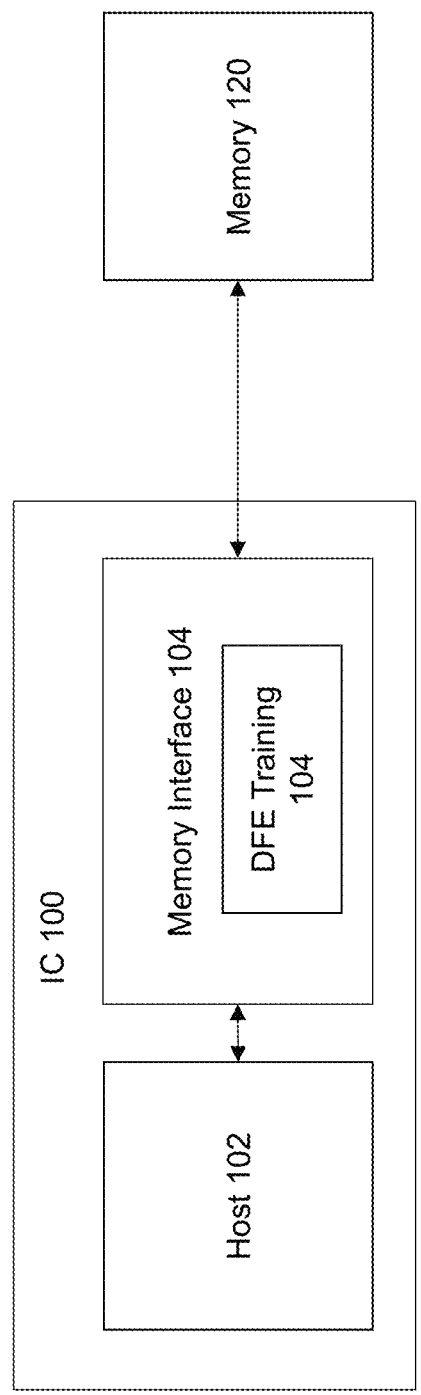
FIG. 1 illustrates an example interface between an integrated circuit (IC) and a memory module, in accordance with some embodiments described herein.

FIG. 1 illustrates an example interface between an integrated circuit (IC) 100 and a memory module 120, in accordance with some embodiments described herein. The memory module 120 is a dynamic random access memory (DRAM) that is connected to the integrated circuit by a bus, which can include for example, an address bus, a data bus, read-write (R/W) signals, and a chip-enable (CE) signal as is known to those skilled in the art. IC 100 may be implemented, for example, as an application specific integrated circuit (ASIC) or a system on a chip (SoC). Host 102 is a microprocessor such as a CPU, DSP or processor core. Memory module 120 may be controlled on a system clock and can therefore be referred to as SDRAM. Embodiments of IC 100 can include additional components than shown in FIG. 1, however illustration thereof is omitted herein for the sake of clarity.

Single data rate (SDR) SDRAM was originally built to execute one memory read access or one write access per clock cycle. On each clock cycle, an n-bit word may be transferred to or from the memory. The word length is, in some embodiments, configured in multiples of eight, and in more recent computer machines, it is common to transfer 64-bit words per clock cycle. DDR SDRAM was implemented as an improvement over SDR SDRAM and is capable of performing two read accesses or two write accesses per clock cycle. This was accomplished by performing one access on the rising edge of the clock and one access on the falling edge of the clock. In this manner, the data transfer rate is doubled by transferring two 64-bit words per clock cycle. The standard protocols for operating DDR SDRAM are defined by JEDEC (Joint Electron Device Engineering Council), with the most recent standards including GDDR6. The operation of host 102 involves the execution of programs that are loaded into the memory module 120 so as to create, edit, and delete data that is also stored in the memory module 120 or other devices. Specifically, each microprocessor operation involves a fetch and execute cycle where an instruction is read from the memory module 120, decoded by the host 102, and executed. Also, the execution of the instruction often involves a data read or a data write to the memory module 120. Each of these instruction cycles is performed synchronously to a system clock, with the duration of the instruction cycle lasting between one and three clock cycles. More particularly, during a read operation, the host 102 indicates the address location from which data from the memory module 120 is to be read. Memory interface 104 is responsible for indicating the address on the address bus, floating the data bus (high Z or high impedance state), and asserting the CE and R/W signals for a read operation. Then the memory module 120 places the data from the memory location indicated by the address bus onto the data bus. The memory interface 104 then reads the data from the data bus. More particularly, receiver 106 converts the data signals from the memory module 120 to the voltage levels needed by host 102, and the read operation is complete.

The memory interface 104 will include DDR interface receivers for communicating with memory module 120. As previously noted, state-of-the-art DRAM protocols have increasingly challenged receiver designs with higher bandwidth requirements, low power needs, wide input common mode range and introduction of channel equalization techniques. With embodiments of the invention, DFE training 104 is applied to implement a training scheme for the memory interface. In essence, the DFE is applied in the current invention to adjust an offset in the receiver reference based on previous bits. The reference is adjusted to detect a correct bit pattern based on the previous one or more bits, where the quantity of the adjustment is referred to as the "coefficient". When this approach is applied, the system provides enough of a margin to optimally allow for proper detection of the logic "1" and "0" bits that are received. This can be used to counter-act the effects of ISI (inter-symbol interference) as a limiting factor for proper interface to memory devices.

Figure 2:
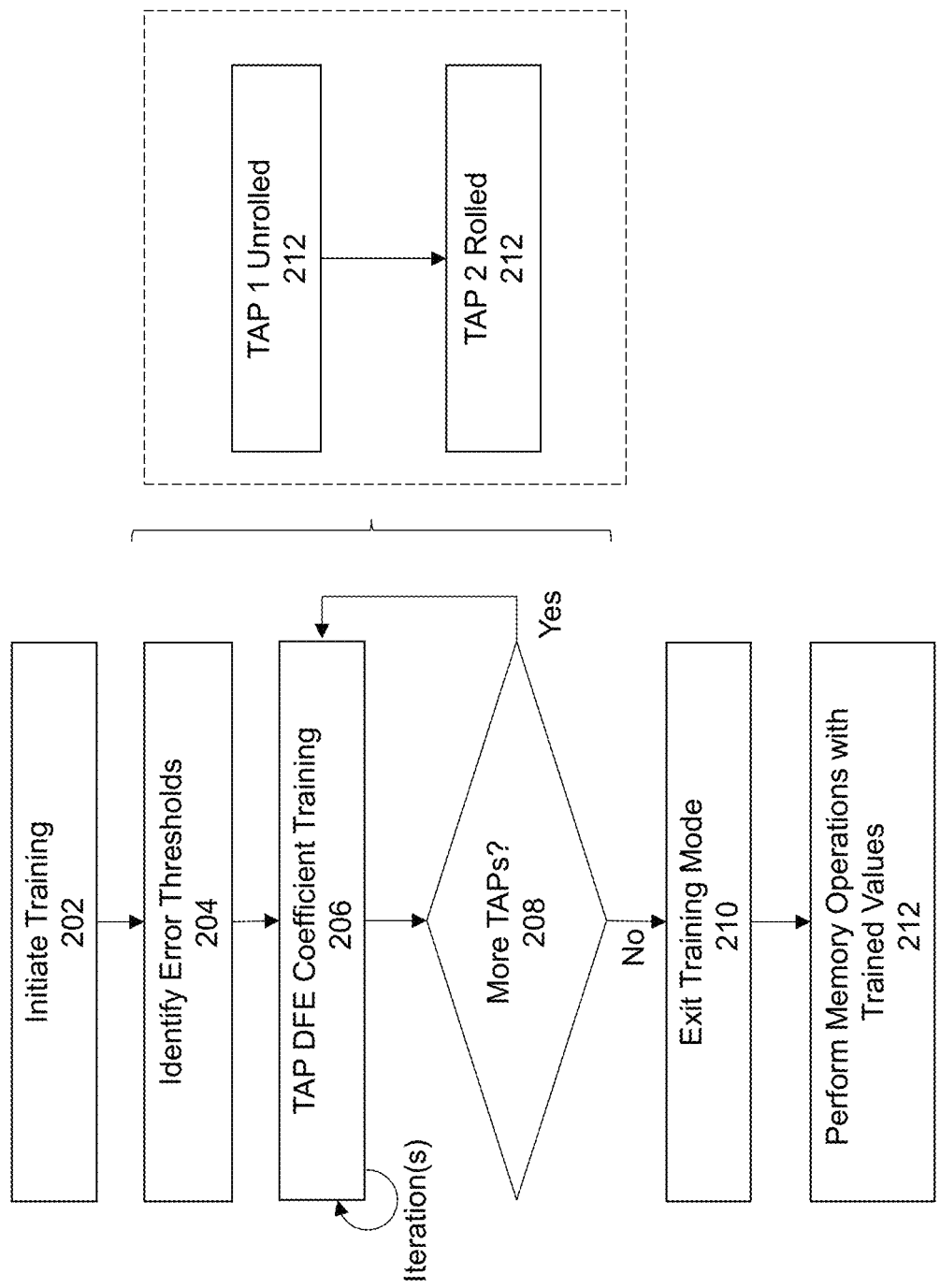
FIG. 2 provides a flow diagram of an approach to implement some embodiments of the invention.

FIG. 2 provides a flow diagram of an approach to implement some embodiments of the invention. At 202, training is initiated for the interface device. It is noted that the interface device may operate according to different modes of operation, which include at least a first mode for normal operations and a second mode for training. During the normal operations mode, the interface device is performing typical operations relative to the memory device, e.g., to perform ordinary I/O operations relative to the memory device according to various configuration parameters set for the receiver. During the training mode, the current training scheme is implemented to identify the optimal parameters to configure for the receiver to identify the logic "1" and "0" bits.

With the current embodiment, the training scheme is implemented to include two Tap stages, with a 1st Tap unrolled (212) and 2nd Tap rolled (212) to train the DFE coefficients. While the currently discussed embodiment has a configuration of a first unrolled Tap followed by a second rolled Tap. It is noted that the inventive concept is not limited in its scope to this current configuration, and indeed may be implemented using any number or combination of one or more unrolled or rolled Taps.

With regards to the first Tap stage, this is implemented generally in the procedure flow by first automatically identifying error threshold(s) at step 204. It is noted that in the present procedure, an approach is provided (as described in more detail below) to automatically identify the error thresholds. This is in contrast to alternative approaches where the error thresholds need to be pre-selected. By using the current approach to optimally determine the error threshold, this permits more accurate identifications of the error samples, and hence greater ability to resolve later determinations of the DFE coefficients.

At 206, the procedure performs DFE coefficient training to identify the coefficient(s) for the first Tap stage. It is noted that an iterative process may be performed to gradually improve the coefficient value(s), where from a starting coefficient that may not be very accurate, each succeeding training cycle can be performed to improve the coefficient to more accurately identify the bit of interest. The training process is performed through multiple iterations until acceptable coefficient values have been obtained for the current Tap stage.

A determination is made at 208 whether there are any further Tap stages to process. If so, then the process returns back to step 206 to perform the appropriate DFE coefficient training for that Tap stage.

As discussed below, the DFE coefficient training may differ between the different Tap stages. For example the specific steps to perform DFE coefficient training for rolled DFE is likely to be different from the specific steps to perform DFE coefficient training for unrolled DFE.

Once the Tap stages have completed, then the process exits the training mode at step 210. At this point, the training scheme will have identified the trained coefficient value(s) for the interface device. Therefore, at 212, the trained coefficient value(s) are used to perform ongoing memory operations.

As discussed above, the different Tap stages may be either unrolled or rolled. With rolled DFE, the system will dynamically change the reference value at a receiver or the offset of the receiver based upon previous bits. With unrolled DFE, the values are not changed dynamically.

Figure 3A:
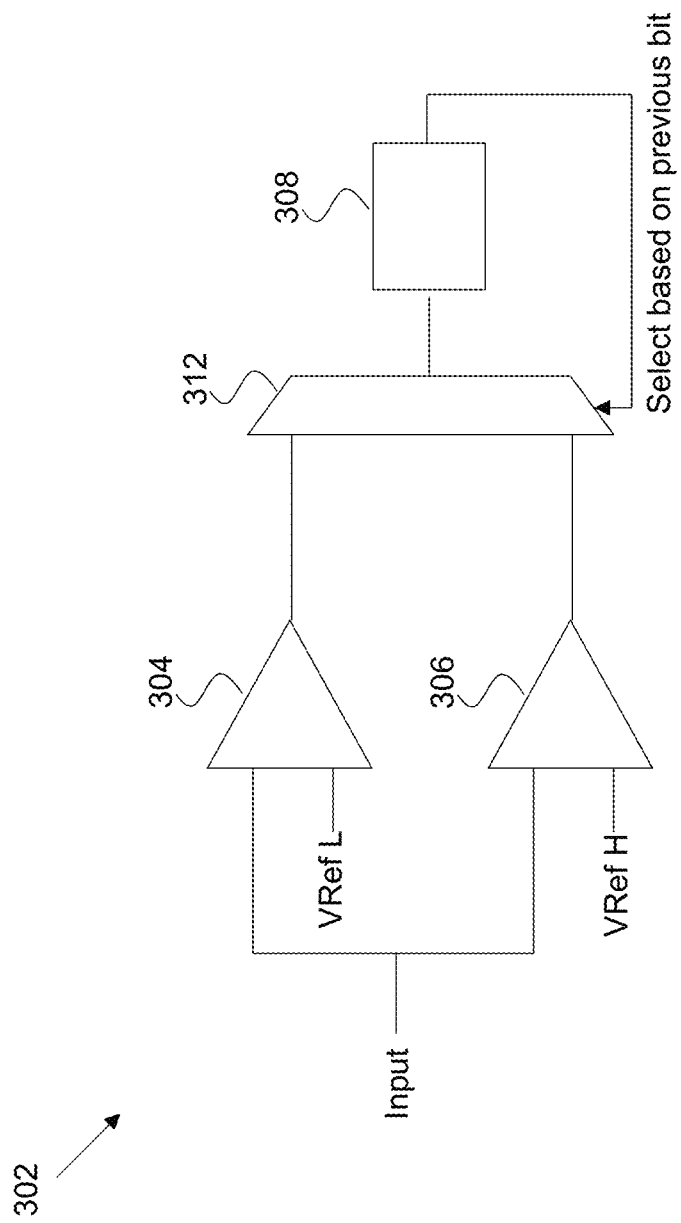
FIG. 3A illustrates unrolled DEE.
Figure 3B:
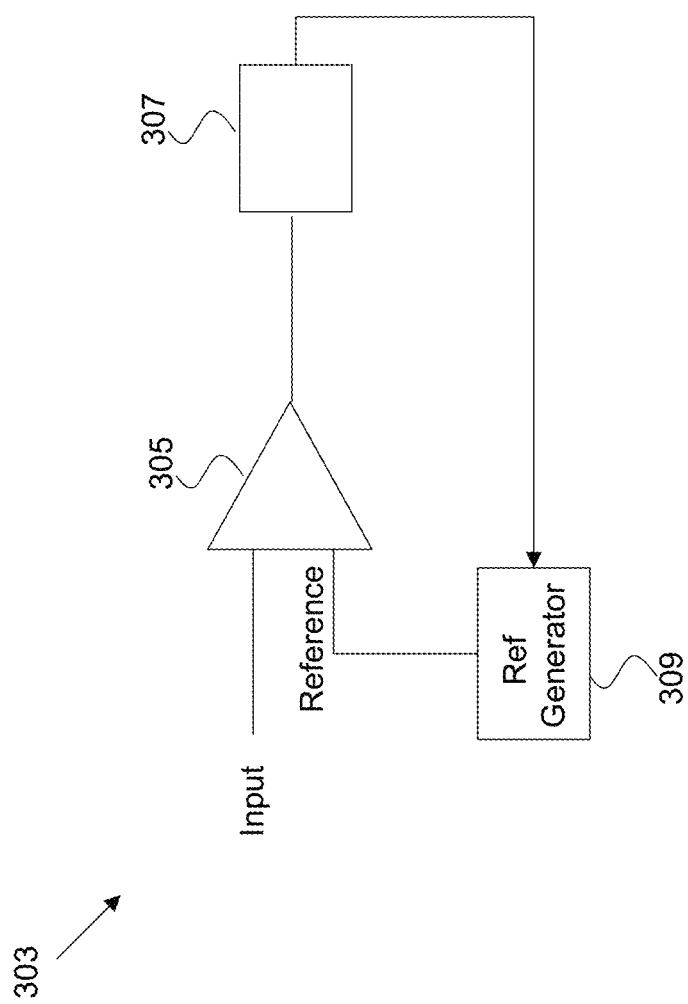
FIG. 3B illustrates rolled DEE.

To illustrate these concepts, consider the diagram for implementing unrolled DFE shown in FIG. 3A compared to the rolled DFE approach shown in FIG. 3B. For the unrolled DFE approach of FIG. 3A, two receivers 304 and 306 are being used. Each receiver in this example includes input pins VPAD and VREF and an output pin. In general, the receivers provide an amplified output at their respective output pin based on the data provided from DDR memory at input pin VPAD (i.e. one bit of data). VREF is a reference voltage that is used for detecting whether the VPAD signal is a logic "1" or a "0" and effectively represents the input common mode level of the circuit. VREF L is a reference chosen for a previous low bit and VREF H is a reference chosen for a previous high bit.

With the unrolled approach, there are two possible values from the two receivers, and a mux 312 is used to select the appropriate value. The section is based upon a previous bit, e.g., delayed through a flop 308.

In contrast, the rolled approach shown in FIG. 3B only includes a single receiver 305. Here, a reference generator 309 is used to dynamically generate the reference for the receiver 305 based upon a control signal received from Tap 2 component 307.

The advantage of the unrolled approach is that it is a much faster to execute than the rolled approach. This is because the rolled approach requires additional processing time in order to use feedback to select a reference value. This is the reason that the unrolled approach is used for the first Tap and the rolled approach is used for the second Tap in the current embodiment, since using an unrolled approach for the first Tap permits much faster initial processing, and hence facilitates the ability to close timing for the interface operation.

Figure 3C:
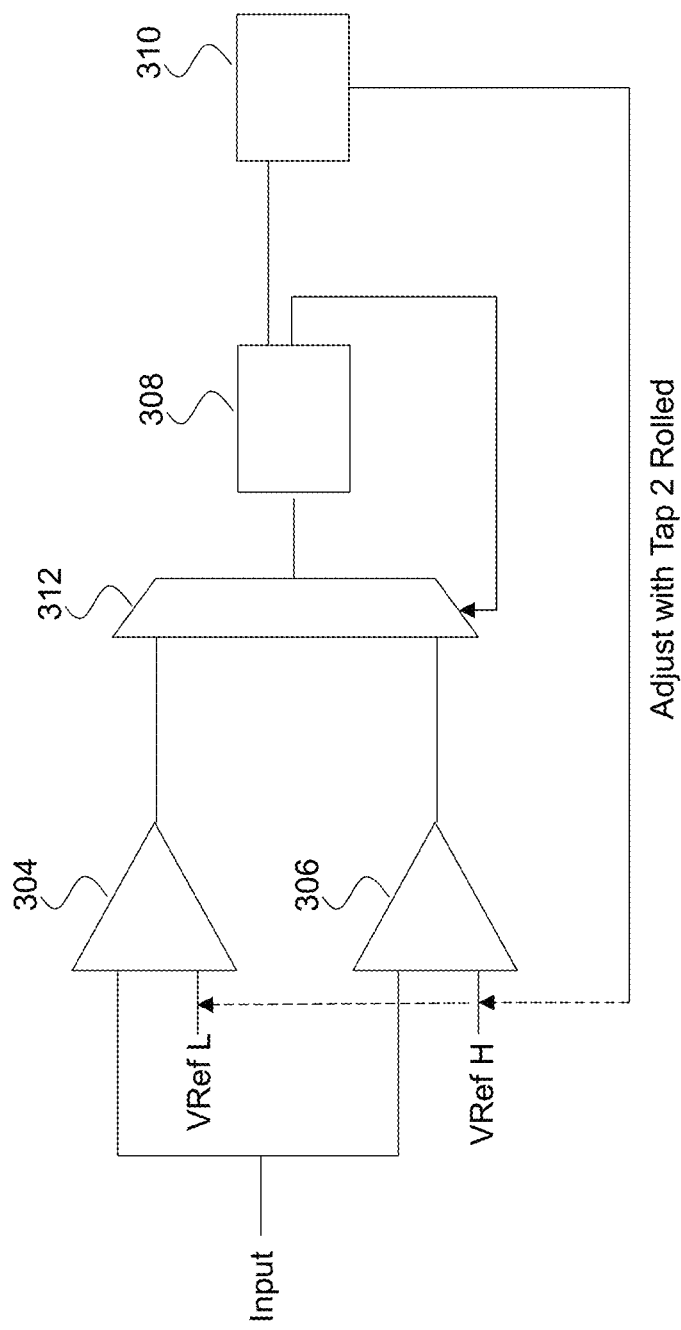
FIG. 3C illustrates Tap 1 unrolled and Tap 2 rolled.

FIG. 3C shows a diagram of Tap 1 with the unrolled approach combined with Tap2 having a rolled approach. Here, receivers 304 and 306 operate in an unrolled Tap 1 stage through mux 312 and flop 308, as described above. However, the reference values to the receivers 304 and 306 are adjusted after a delay period from the Tap 2 logic structure 310.

Figure 4A:
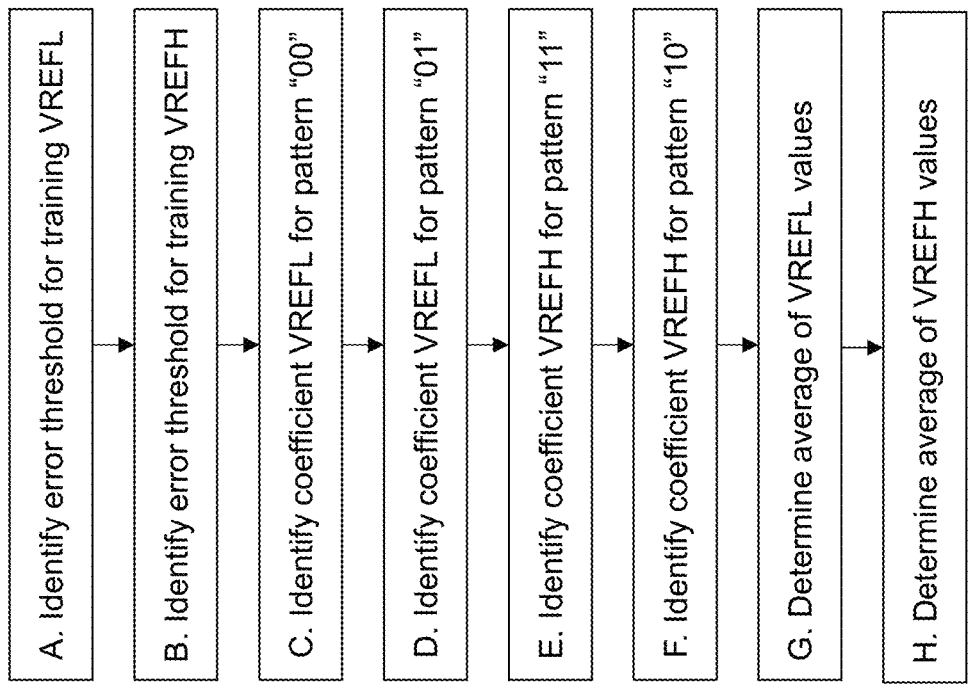
FIG. 4A shows a procedure flow for the Tap 1 unrolled DFE training according to some embodiments of the invention.

FIG. 4A shows a procedure flow for the Tap 1 unrolled DFE training according to some embodiments of the invention. The Tap1 (unrolled) DFE training comprises the following steps described below:

Step A: Identify error threshold for training VREFL
Step B: identify error threshold for training VREFH
Step C: Identify optimal coefficient VREFL (for pattern "00")
Step D: Identify optimal coefficient VREFL (for pattern "01")
Step E: identify optimal coefficient VREFH (for pattern "11")
Step F: Identify optimal coefficient VREFH (for pattern "10")
Steps G and H: Determine averages for the VREFL and VREFH values The error thresholds are used to determine whether, after applying a given coefficient, that an adjusted signal level has reached an expected value or not. Therefore, the error threshold pertains to an expected value when the "eye" is open. As such, the error thresholds need to be determined since it is the threshold used to detect possible errors. An eye diagram having an "eye" refers to a type of diagram that is typically used for electrical/electronic measurements, often for analysis of signal quality in the digital domain. This type of diagram gets its name due to the fact that it has the appearance of an eye based upon superimposing successive waveforms onto the same diagram to the point that the appearance of an eye may appear in the diagram.

In the current embodiment, the determination of the error thresholds occurs as the initial step, since the identified error thresholds are thereafter used in the subsequent steps to identify the DFE coefficients. Separate steps are performed to identify the optimal coefficients for VREFL and VREFH for the different bit patterns, where pattern "00" refers to a previous bit 0 and a current bit 0, pattern "01" refers to a previous bit 0 and a current bit 1, pattern "11" refers to a previous bit 1 and a current bit 1, and pattern "10" refers to a previous bit 1 and a current bit 0.

The final Tap1 unrolled coefficient VREFL_FINAL is the average of the two identified VREFL values, and the final Tap1 unrolled coefficient VREFH_FINAL is the average of the two identified VREFH values.

Each of above steps are described in more detail with respect to the descriptions of FIGS. 6A-6G.

Figure 4B:
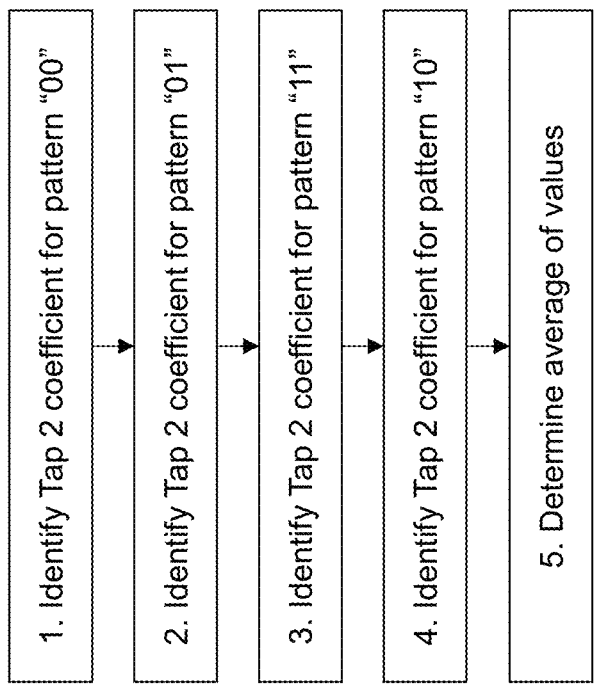
FIG. 4B shows a procedure flow for the Tap 2 rolled DFE training according to some embodiments of the invention.

FIG. 4B shows a procedure flow for the Tap 2 rolled DFE training according to some embodiments of the invention. The Tap2 (rolled) DFE training comprises the following steps described below:

Step1: Identify optimal Tap2 coefficient for pattern "00"
Step2: Identify optimal Tap2 coefficient for pattern "01"
Step3: Identify optimal Tap2 coefficient for pattern "11"
Step4: Identify optimal Tap2 coefficient for pattern "10"
Step5: Determine average coefficient value The final Tap2 coefficient TAP2_FINAL, is found by averaging above four values. Each of above steps are described in more detail with respect to the descriptions of FIGS. 7A-7E.

Figure 5A:
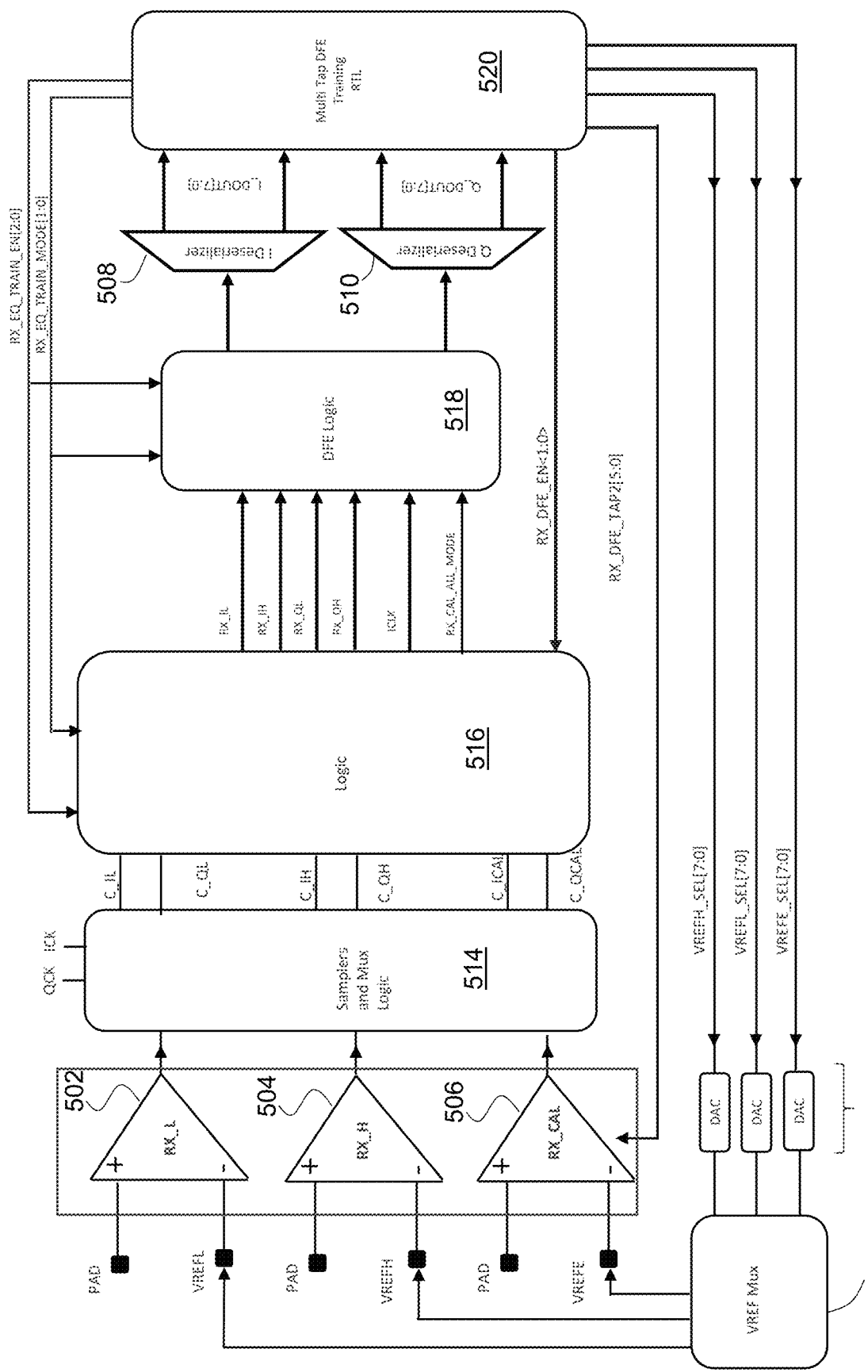
FIG. 5A shows an illustration of an example architecture of a circuit that may be used to implement some embodiments of the invention.

FIG. 5A shows an illustration of an example architecture of a circuit that may be used to implement some embodiments of the invention. For the proposed training scheme to work for closed eyes, an additional receiver may be used to correctly determine the reference bit stream. As shown in FIG. 5A, three receivers are used, with two receivers (502 and 504) used with DFE applied to correctly determine reference bit stream and one receiver (506) to compute error samples during training. The algorithm is run multiple times, where DFE coefficients from previous iteration is used for the current iteration, thereby gradually opening up the eye. Therefore, in some embodiments, the 1 Tap unrolled auto zeroing receiver has 3 receiver (2 receiver for unrolled DFE) and a calibration receiver. The receiver with VREFL and receiver with VREFH acts as reference receiver with DFE enabled.

This training scheme is implemented using an auto zero receiver which is area and power efficient by intelligently re-using calibration receiver as error receiver without additional hardware. For instance, U.S. Pat. No. 10,545,895 discloses a known arrangement of three receivers, including RX_L, RX_H, and a calibration receiver RX_CAL. The current DFE training scheme can be employed in that architecture without the requirement to include any additional hardware, merely by using the currently described processing flow through that architecture.

The output of reference receiver are I samples sent through RX_IL and RX_IH to a deserializer. The calibration receiver (e.g., the spare receiver in an auto-zero Rx structure) works as an error receiver. The output of error receiver are error samples that are sent through RX_QL data to the deserializer. The I data goes to the I deserializer (508) and the E data goes to the Q deserializer (510). The I samples (I data) and E samples (Q data) can be defined as fixed patterns, so that the training engine ignores these samples during calibration mode.

During the training process, the VREFE value is adjusted (by VREF Mux 512) to identify correct coefficient values for the system. In the training processes, this means that the reference signals VREFL and VREFH may be adjusted at various iterative time frames as part of the system processing for training. The DACs 513 are used to change the L, H, and E values of the references during training. The identified coefficient values would be stored into registers as final values at the end of the training period. During normal operation, the fixed values for VREFL and VREFH would be applied to implement normal memory operations.

Component 514 is used to implement sampling logic and mux logic for outputs from the receivers. Component 516 implement the Tap 2 logic for identifying the Tap 2 DFE coefficients. Component 518 implement DFE logic to select between the L output and the H output, with the selection based upon a previous bit value. Component 520 implements training logic to read in values, and to determine whether an error exists or does not exists. This is used to make adjustments for both the Tap1 and Tap 2 DFE training.

FIG. 5B describes a description of the signals identified within FIG. 5A. FIG. 5C provides a description of the registers used within the architecture of FIG. 5A.

Figures 1, 2, 6B:
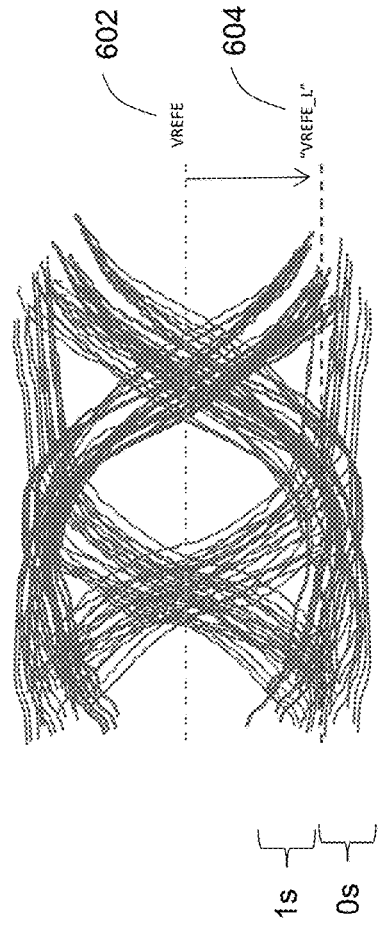

FIGS. 6A-6G provide a detailed illustrative example of the individual steps shown in FIG. 4A to implement the Tap 1 unrolled DFE training phase. FIG. 6A describes certain initial actions for the Tap 1 training, where default data values are loaded into certain registers, including registers associated with the "VREF_INIT", "VREFL_FINAL" and VREFH_FINAL" values.

The pseudocode of FIGS. 6B-1 and the eye diagram of 6B-2 illustrate an approach to identify the error threshold VREFE_L for the logic low receiver. The processing starts by loading certain register values. Thereafter, the processing checks whether the current bit is for data 0 (by checking "I_DOUT=0?"). If so, then it is verified that the data is for data 0, and hence the processing continues.

Next, the processing checks whether the number of zeros (0s) is greater than the number of ones (1s) for the initial error threshold value. At the initial position 602, the number of 0s certainly is greater than the number of 1s. In this situation, the VREFE location is decreased (lowered) in an incremental manner. This check continues until the number of is and the number of 0s is approximately equal at the VREFE location. For instance, at the position 604, it can be seen that the number of is above the VREFE_L line is approximately equal to the number of 0s below the line. This location can be detected once the VREFE location begins to wobble during processing.

FIGS. 6C-1 and 6C-2 similarly provide an illustration of an approach to identify the error threshold VREFE_H for the logic high receiver. As before, the processing starts by loading certain register values. Thereafter, the processing checks whether the current bit is for data 1 (by checking "I_DOUT=1?"). If so, then it is verified that the data is for data 1, and hence the processing continues.

Next, the processing checks whether the number of zeros (0s) is greater than the number of ones (1s) for the initial error threshold value. At the initial position 606, the number of 1s is much greater than the number of 0s. In this situation, the VREFE location is increased (raised) in an incremental manner. This check continues until the number of 1s and the number of 0s are approximately equal at the VREFE location. For instance, at the position 608, it can be seen that the number of is above the VREFE_H line is approximately equal to the number of 0s below the line. This location can be detected once the VREFE location begins to wobble during processing.

Figures 1, 2, 6D:
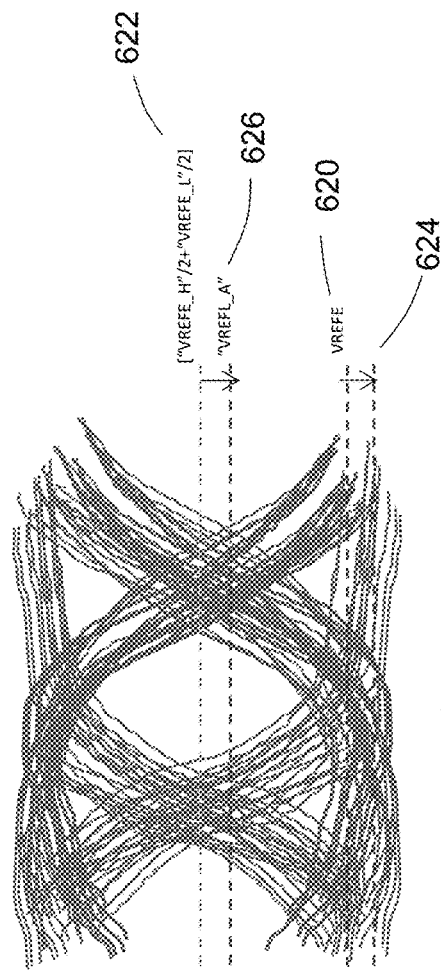

FIGS. 6D-1 and 6D-2 illustrate an approach to determine the coefficient VREFL for pattern "00". A check is made to make sure the current pattern is "00" (by checking "I_DOUT=0 and I_DOUT_DLY=0 ?", where I_DOUT is the current bit and I_DOUT_DLY is the previous bit). If this is true, then the process proceeds. Otherwise, this process will ignore those bits.

The procedure begins by reading in the values of the VREFE_L that was determined in step A as an initial value for VREFE (620). The average of the logic high (VREFE_H) and the logic low (VREFE_L) thresholds is represented at 622.

Next, the process will look at the E (error) samples, which are the Q data (Q_DOUT). A check is made whether the number of 0s are greater than the number of 1s. If so, then the VREFE value is adjusted, i.e., decreased. Otherwise, it is increased. This value is incrementally changed until "wobbling" is detected, which means that the number of signals above the line (624) is approximately the same as the number of signals below the line.

The movement of the reference is the distance between line 620 and line 624, which is the delta change for the reference. This delta is used to find the actual value of the coefficient "VREFL_A" at line 626. This can be done by applying the delta found between lines 620 and 624 to the value at line 622. In some embodiments, this is accomplished by calculating "["VREFE_H"/2-"VREFE_L"/2+VREFE]". The above processing results in a coefficient value VREFL for pattern "00".

Figures 1, 2, 6E:
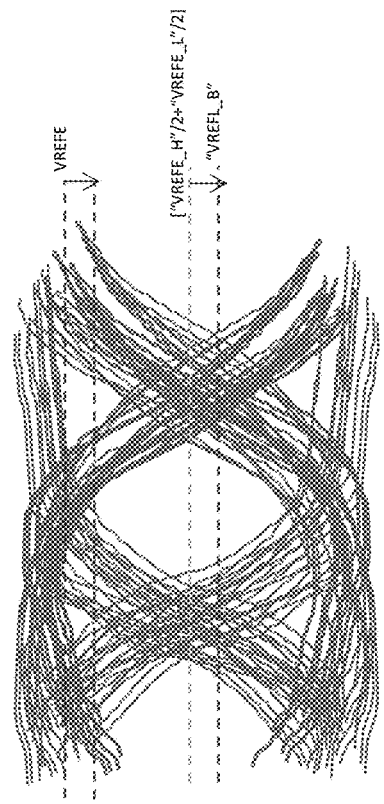

FIGS. 6E-1 and 6E-2 illustrate an approach to determine the coefficient VREFL for pattern "01". A check is made to make sure the current pattern is "01" (by checking "I_DOUT=1 and I_DOUT_DLY=0?", where I_DOUT is the current bit and I_DOUT_DLY is the previous bit). If this is true, then the process proceeds. Otherwise, this process will ignore those bits.

The procedure reads in the values of the VREFE_H that was previously determined as an initial value for VREFE. As before, the average of the logic high (VREFE_H) and the logic low (VREFE_L) thresholds is determined. The process will look at the E (error) samples, and check whether the number of 0s are greater than the number of 1s. If so, then the VREFE value is decreased, but otherwise it is increased. This value is incrementally changed until "wobbling" is detected, which means that the number of signals above the current line is approximately the same as the number of signals below the line. The delta change for the reference is used to find the actual value of the coefficient "VREFL_B", which in some embodiments, is accomplished by calculating "["VREFE_L"/2-"VREFE_H"/2+VREFE]". The above processing results in a coefficient value VREFL for pattern "01".

Figures 1, 2, 6F:
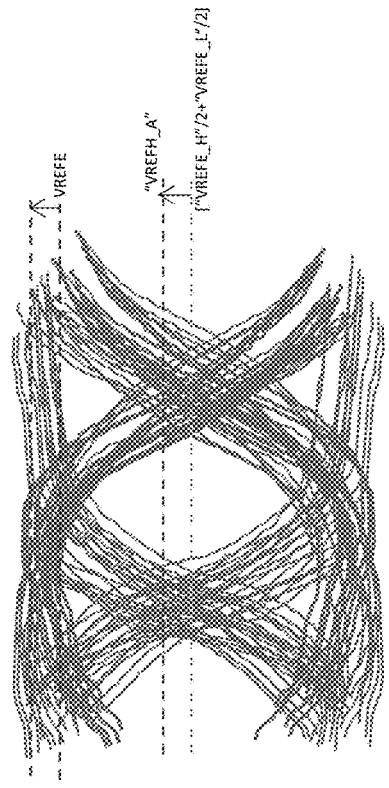

FIGS. 6F-1 and 6F-2 illustrate an approach to determine the coefficient VREFH for pattern "11". A check is made to make sure the current pattern is "11" (by checking "I_DOUT=1 and I_DOUT_DLY=1. If this is true, then the process proceeds. Otherwise, this process will ignore those bits.

The procedure reads in the values of the VREFE_H that was previously determined as an initial value for VREFE. As before, the average of the logic high (VREFE_H) and the logic low (VREFE_L) thresholds is determined. The process will look at the E (error) samples, and check whether the number of 0s are greater than the number of 1s. If so, then the VREFE value is decreased, but otherwise it is increased. This value is incrementally changed until "wobbling" is detected, which means that the number of signals above the current line is approximately the same as the number of signals below the line. The delta change for the reference is used to find the actual value of the coefficient "VREFH_A", which in some embodiments, is accomplished by calculating "["VREFE_L"/2-"VREFE_H"/2+VREFE]". The above processing results in a coefficient value VREFH for pattern "11".

FIGS. 6G-1 and 6G-2 illustrate an approach to determine the coefficient VREFH for pattern "10". A check is made to make sure the current pattern is "10" (by checking "I_DOUT=0 and I_DOUT_DLY=1. If this is true, then the process proceeds. Otherwise, this process will ignore those bits.

The procedure reads in the values of the VREFE_L that was previously determined as an initial value for VREFE. As before, the average of the logic high (VREFE_H) and the logic low (VREFE_L) thresholds is determined. The process will look at the E (error) samples, and check whether the number of 0s are greater than the number of 1s. If so, then the VREFE value is decreased, but otherwise it is increased. This value is incrementally changed until "wobbling" is detected, which means that the number of signals above the current line is approximately the same as the number of signals below the line. The delta change for the reference is used to find the actual value of the coefficient "VREFH_B", which in some embodiments, is accomplished by calculating "["VREFE_H"/2-VREFE_L/2+VREFE]". The above processing results in a coefficient value VREFH for pattern "10".

Thereafter, a calculation is made of the average value for the VREFL_A and VREFL_B values. Similarly, a calculation is made of the average value for the VREFH_A and VREFH_B values. The above processing may occur for multiple iterations until acceptable coefficient values have been identified. At that point, Tap 1 processing is done.

FIGS. 7A-7E provide a detailed illustrative example of the individual steps shown in FIG. 4B to perform the Tap 2 DFE training. This identifies the one coefficient which is applied as an offset to both VREFL and VREFH to improve the eye margins. Here, the concept is that the references VREFE_L and VREFE_H have already been found, and the Tap 2 process will make additional adjustments to improve the reference values.

As shown in FIG. 7A-1, the Tap 1 coefficient will be loaded into the VREFE value ("VREFL_FINAL+ (VREFE_L-VREFE_H)/2"). This procedure is for the "00" pattern, so a check is made to make sure the current pattern is "00" (by checking "I_DOUT=0 and I_DOUT_DLY=0 ?".

The way the coefficient is adjusted is by looking into the error (Q_DOUT) and the previous-to-previous bit (I_DOUT_DLY_2). Because this is a rolled approach, the polarity will have to be determined, where the decision to add or subtract is based upon the previous-to-previous bit. This is accomplished by performing an XOR between the error and the previous-to-previous bit (Q_DOUT^I_DOUT_DLY_2). If the number of 0s is more than the number of 1s, then Tap2 is increased. Otherwise, it is decreased. Effectively, this can move up or down according to the previous-to-previous bit. As illustrated in FIG. 7A-2, this process continues until wobbling within a delta threshold is detected. At this point, the Tap 2 coefficient for pattern "00" has been determined and can be stored into the register TAP2_L_A.

In a similar manner, the Tap 2 coefficients can be found for each of the other "01", 11", and "10" patterns. FIGS. 7B-1 and 7B-2 illustrate an approach to determine the Tap 2 coefficient for the "01" pattern where the coefficient value is stored in the register TAP2_L_B, FIGS. 7C-1 and 7C-2 illustrate an approach to determine the Tap 2 coefficient for the "11" pattern where the coefficient value is stored in the register TAP2_H_A, and FIGS. 7D-1 and 7D-2 illustrate an approach to determine the Tap 2 coefficient for the "10" pattern where the coefficient value is stored in the register TAP2_H_B.

Figure 7E:
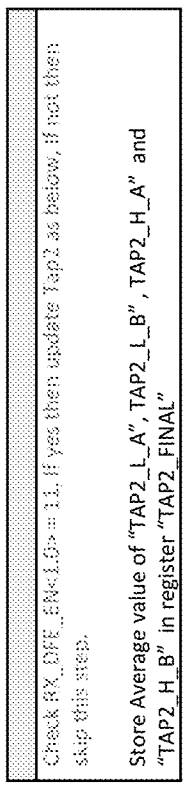

The final step for Tap 2 processing is to generate an average from the above calculations. As shown in FIG. 7E, the average value is obtained by averaging the values in the registers TAP2_L_A, TAP2_L_B, TAP2_H_A, and TAP2_H_B, where the final value is stored in the register TAP2 FINAL.

In some embodiments, the above-described training process should occur only in the presence of sufficient data. If a too-small amount of data is used for training, then it is possible that an insufficient amount of data would produce sub-optimal values for the device. Therefore, an approach is provided in some embodiments to ensure that sufficient data exists for the training procedure.

FIGS. 8A-B provide an illustration of an approach to make sure that sufficient data exists to make an increase or decrease to a value during training. As shown in FIG. 8A, an accumulator is used to find out the effective increment or decrement of Tap coefficients. The initial value of the accumulator is set to the accumulator size "accum_size". The number of 'UP' and 'DOWN' are found out from parallel data I_DOUT and Q_DOUT. For each parallel set of data UP-DOWN is calculated and added to accumulator.

A bit pattern is used for DFE training (e.g., PRBS 7). This pattern is received from the front end receiver, with where 8-bit parallel I_DOUT and Q_DOUT are generated. UP and DOWN signals for Tap1 and Tap2 are generated from the bitwise operation of I_DOUT and Q_DOUT data.

As shown in FIG. 8B, upper and lower threshold are set for the accumulator. If the accumulator reaches upper threshold (e.g., 2*accum_size), then the TAP_UP signal is generated. Similarly, if it reaches the lower threshold (e.g., 0) then the TAP_DOWN signal is generated. Once a threshold is reached, then the accumulator is reset to the initial value, e.g., "accum_size" as shown in FIG. 8B.

Essentially, the accumulator checks for an up signal (increase coefficient) or a down signal (decrease coefficient). Those signals will come to the accumulator. If the number of UPs is greater than the number of DOWNs, then it will go positive. If the number of UPs is less than the number of DOWNs, then it will go negative. These intermediate positive or negative changes will not initially change the reference values. However, any sustained positive or negative movement sufficient to reach the thresholds as shown in FIG. 8B will result in an actual change to the reference/coefficient value. At this point, the accumulator will reset back to zero and begin again.

Figure 9:
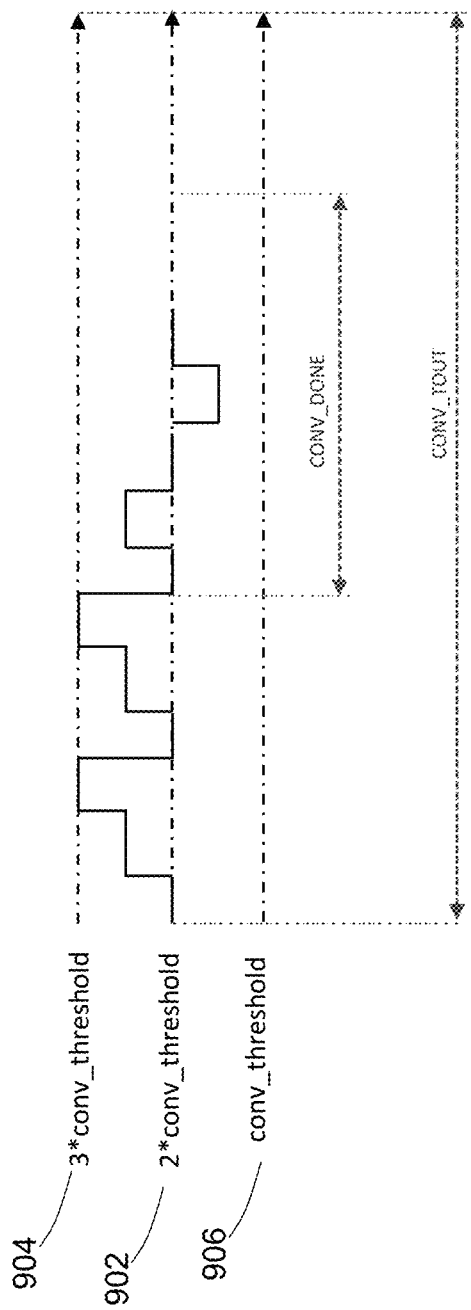
FIG. 9 shows an approach according to some embodiments to determine a final convergence for the training values.

FIG. 9 shows an approach according to some embodiments to determine a final convergence for the training values. Convergence thresholds will determine the accuracy of the final Tap coefficients. A convergence counter is used to arrive at the final tap coefficients, where the counter count value is set initially "2*conv_threshold", which counts up to maximum "3*conv_threshold" and minimum "cony threshold". The counter is re-initialized to "2*conv_threshold" every time it's count value reaches maximum and minimum value set or when it moves to next training step. The counter counts up if a TAP_UP signal is generated and counts down if a TAP_DOWN signal is generated. Another counter counts the number of clock cycles from beginning of training. The final Tap value is determined when this count reaches to at least one of the following two programmed values: (a) For CONV_DONE, if the counter does not reset for these many clock cycles, then convergence is achieved and final Tap values are stored; (b) For CONV_TOUT, if the counter keeps getting reset for these many clock cycles, then convergence is not achieved, and the system raises a "time out" signal, e.g., where the last Tap values are stored.

To further explain, based upon approach of FIGS. 8A-B, a determination is made whether to increase (Tap UP) or decrease (Tap DOWN) a reference/coefficient. In FIG. 9, this is represented with a starting point at 902, with each incremental increase not counted until reaching a threshold 904 and each incremental decrease not counted until reaching threshold 906. When reaching a threshold, it will reset back to 902. If there are a large number of continuous UPs then training has not converged, and similarly if there are a large number of continuous TDOWNs, then training has also not converged. This means that the system is still in the midst of finding the optimal reference/coefficient values. Convergence has been reached only when the number of UPs is mixed with the DOWNs such that they do not cross the thresholds for a given time period "CONV_DONE".

Therefore, what has been described is an improved approach to perform equalization training for memory interfaces. This approach provides numerous advantages, including: (a) the proposed training scheme calculates average of lower and higher values of error thresholds as initial VREF, and any error introduced by nominal VREF training will be overwritten; (b) conventional LMS based DFE training needs additional error receivers for logic low and logic high along with deserializers to find E samples and also error threshold need to be set initially; (c) this approach finds the error threshold through hardware and re-uses an existing calibration receiver and deserializer (Q sample data) for E samples to find DFE coefficients; each unrolled DFE coefficient value is calculated serially for unique pattern by avoiding parallel hardware without losing accuracy; (d) this scheme works very well for high lossy channel (closed eye) without using additional by running training algorithm multiple times; (e) This approach can be easily extended to multi tap (more than 1 tap) without any additional hardware.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   initiating training of a memory interface;
   identifying an error threshold;
   performing a first tap decision feedback equalizer (DFE) training for a first coefficient using the error threshold, wherein the first tap DFE training comprises an unrolled approach;
   performing a second tap DFE training using the first coefficient to generate a second coefficient, wherein the second tap DFE training comprises a rolled approach;
   exiting the training; and
   performing memory operations on a memory using the second coefficient.

2. The method of claim 1, wherein multiple iterations of the first or second tap DFE trainings are performed.

3. The method of claim 1, wherein the error threshold is identified by determining a first error threshold for training a low reference and a second error threshold for training a high reference.

4. The method of claim 1, wherein the first tap DFE training is performed by:
   identifying a first coefficient for pattern "00";
   identifying a second coefficient for pattern "01";
   identifying a third coefficient for pattern "11"; and
   identifying a fourth coefficient for pattern "10".

5. The method of claim 4, wherein a first average is obtained by averaging the first and second coefficients and a second average is obtained by averaging the third and fourth coefficients, wherein the first average corresponds to a low reference and the second average corresponds to a high reference.

6. The method of claim 1, wherein the second tap DFE training is performed by:
   identifying a first rolled coefficient for pattern "00";
   identifying a second rolled coefficient for pattern "01";
   identifying a third rolled coefficient for pattern "11";
   identifying a fourth rolled coefficient for pattern "10"; and
   generating an average coefficient value for the first, second, third, and fourth rolled coefficients.

7. The method of claim 1, wherein three receivers are used such that two receivers determine reference bit streams and one receiver computes error samples during training.

8. The method of claim 1, wherein an auto zeroing receiver used for the first tap DFE training comprises three receivers, wherein two receivers are used for an unrolled DFE and a third receiver corresponds to a calibration receiver.

9. The method of claim 8, wherein the auto zeroing receiver reuses the calibration receiver as an error receiver.

10. The method of claim 1, wherein an iterative approach is performed to increase a complexity of training pattern, where a DFE coefficient from a previous iteration is used for a subsequent iteration.

11. The method of claim 10, wherein the iterative approach gradually opens an eye.

12. The method of claim 1, wherein an accumulator is used to change a reference or coefficient value by identifying a threshold number of data changes.

13. The method of claim 1, wherein convergence is determined by identifying a convergence threshold, and checking whether changes to a reference or coefficient value are within a range determined based on at least the convergence threshold over a threshold time period.

14. A system comprising:
a first receiver;
a second receiver, wherein the first and second receivers provide amplified outputs; and
a third receiver, wherein
the third receiver computes error samples during training,
outputs of the first, second, and third receivers are used during training to:
perform a first tap decision feedback equalizer (DFE) training for a first coefficient using an error threshold, the first tap DFE training comprising an unrolled approach, and
perform a second tap DFE training using the first coefficient to generate a second coefficient, the second tap DFE training comprises a rolled approach, and
memory operations are performed on a memory using the first coefficient and the second coefficient.

15. The system of claim 14, wherein the third receiver comprises a calibration receiver.

16. The system of claim 15, wherein the first, second, and third receivers correspond to an auto zeroing receiver that reuses the calibration receiver as an error receiver.

17. The system of claim 14, wherein the first, second, and third receivers are placed into a training mode to perform identification of an error threshold and exiting the training mode prior to performance of the memory operations on the memory using the first coefficient and the second coefficient.

18. The system of claim 17, wherein an accumulator is used to change a reference or coefficient value by identifying a threshold number of data changes.

19. The system of claim 17, wherein multiple iterations of the first or second tap DFE trainings are performed.

20. The system of claim 14, wherein the error threshold is identified by determining a first error threshold for training a low reference and a second error threshold for training a high reference.

* * * * *